(12) United States Patent
Wang et al.

(10) Patent No.: US 10,038,496 B1
(45) Date of Patent: Jul. 31, 2018

(54) METHOD FOR DETERMINING OPTICAL NETWORK UTILIZATION EFFICIENCY

(71) Applicant: Fujitsu Limited, Kawasaki-shi, Kanagawa (JP)

(72) Inventors: Xi Wang, Murphy, TX (US); Inwoong Kim, Allen, TX (US); Qiong Zhang, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/458,193

(22) Filed: Mar. 14, 2017

(51) Int. Cl.
| | |
|---|---|
| *H04J 14/02* | (2006.01) |
| *H04B 10/079* | (2013.01) |
| *H04B 10/27* | (2013.01) |
| *H04B 10/572* | (2013.01) |

(52) U.S. Cl.
CPC ......... *H04B 10/0795* (2013.01); *H04B 10/27* (2013.01); *H04B 10/572* (2013.01); *H04J 14/0227* (2013.01); *H04J 14/0257* (2013.01); *H04J 14/0263* (2013.01); *H04J 14/0271* (2013.01)

(58) Field of Classification Search
CPC ...... H04B 10/25; H04B 10/27; H04B 10/572; H04J 14/0227; H04J 14/0257; H04J 14/0263; H04J 14/0271; H04Q 11/0005; H04Q 11/02; H04Q 11/0011
USPC .................................. 398/25, 45–57, 79, 89
See application file for complete search history.

(56) References Cited

U.S. PATENT DOCUMENTS

| | | | | |
|---|---|---|---|---|
| 2009/0142055 | A1* | 6/2009 | Qiu | H04J 14/0227 398/45 |
| 2010/0034536 | A1* | 2/2010 | Lee | H04J 14/0283 398/45 |
| 2012/0201541 | A1* | 8/2012 | Patel | H04J 14/0212 398/58 |
| 2015/0295673 | A1* | 10/2015 | Zhang | H04L 45/22 398/5 |
| 2016/0241353 | A1* | 8/2016 | Wright | H04J 14/0256 |

* cited by examiner

*Primary Examiner* — Li Liu
(74) *Attorney, Agent, or Firm* — Baker Botts L.L.P.

(57) ABSTRACT

Methods and systems for determining optical network utilization efficiency include generating a random demand set and calculating a demand fill ratio (DFR) based on the random demand set. The random demand set includes network demands for a given optical network topology that provide 100% of the wavelength slots in the optical network topology. The DFR may be calculated using different wavelength assignment algorithms, such as a first fit wavelength assignment algorithm, from the randomly generated demands in the random demand set. The DFR may be calculated without and with wavelength conversion nodes.

18 Claims, 12 Drawing Sheets

METHOD FOR DETERMINING OPTICAL NETWORK UTILIZATION EFFICIENCY

BACKGROUND

Field of the Disclosure

The present disclosure relates generally to optical communication networks and, more particularly, to methods for determining optical network utilization efficiency.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

As service requests (also referred to herein as "demands") for optical paths for transmission of network traffic in optical networks are received, the service requests (or demands) are filled using a finite capacity of any given optical network. One measure of evaluating optical networks is a utilization efficiency, which has been calculated based on different quantitative values, such as a fraction of demands blocked or a used capacity of the optical network. Many conventional methods of calculating utilization efficiency for optical networks may not actually result in a desired overall operating efficiency of the optical network.

SUMMARY

In one aspect, a method is disclosed. The method may include receiving network topology information for an optical network from a network control system for the optical network, the network topology information specifying nodes in the optical network and existing links between pairs of the nodes, while the network topology information specifies at least one wavelength slot per link. The method may also include populating a wavelength slot set according to the network topology information with wavelength slots available for each link in the optical network, initializing a random demand set for storing the pairs of nodes in a demand sequence as an empty set. The method may further include, repeating method operations until the wavelength slot set is empty. The repeating method operations may include, based on a node pair set specifying the existing links between the pairs of the nodes, randomly selecting a next pair of the nodes as a next network demand specifying at least one wavelength slot between the next pair. When at least one wavelength slot is available from the wavelength slot set between the next pair of nodes, the repeating method operations may also include appending the next network demand to the random demand set to populate the random demand set according to the demand sequence, and removing the wavelength slots between the next pair of nodes from the wavelength slot set. The method may also include, after the wavelength slot set is empty, outputting the random demand set to a user, wherein the random demand set represents 100% of a transmission capacity of the optical network.

In any of the disclosed embodiments, the method may further include initializing assignments of the wavelength slots to the optical network by removing all assigned wavelength slots based on the network topology information. Based on the network topology information, until the random demand set is empty, the method may repeat: based on the demand sequence, selecting a first network demand from the random demand set; if a continuous wavelength slot between the pair of the nodes specified by the first network demand is available in the optical network, using a wavelength assignment algorithm, assigning the first network demand to the optical network; if no continuous wavelength slot between the pair of the nodes specified by the first network demand is available, adding the first network demand to a blocked demand set indicating network demands blocked from being assigned to the optical network; and removing the first network demand from the random demand set. In the method, the continuous wavelength slot between the pair of the nodes specified by the first network demand may be assigned to the first network demand.

In any of the disclosed embodiments, the method may further include evaluating the network demands assigned to the optical network by calculating a demand fill ratio (DFR) for the random demand set given by DFR=(assigned wavelength slots)/(total wavelength slots).

In any of the disclosed embodiments, the method may further include provisioning at least one optical path according to the network demands assigned to the optical network.

In any of the disclosed embodiments of the method, the wavelength assignment algorithm may be a first fit algorithm.

In any of the disclosed embodiments of the method, the node pair set may further specify, for each of the pair of nodes, at least one of: a shortest path between the pair of nodes; a number of wavelength slots between the pair of nodes; a maximum number of wavelength conversions between the pair of nodes; and traffic capacity information for each of the wavelength slots, the traffic capacity information further comprising: a modulation format and a modulation rate.

In any of the disclosed embodiments of the method, the pairs of the nodes may be weighted according to a demand pattern, while randomly selecting the next pair of the nodes may further include randomly selecting the next pair of the nodes to satisfy the demand pattern.

In any of the disclosed embodiments, the method may further include, for each of the network demands in the blocked demand set, if a discontinuous wavelength slot is available between the pair of nodes specified by the network demand: adding, to the network topology, at least one wavelength conversion between the pair of nodes specified by the network demand, and assigning the network demand to the discontinuous wavelength slots occupying different wavelengths in the optical network, while the wavelength conversion converts an optical signal between the different wavelengths.

In any of the disclosed embodiments, the method may further include, with the wavelength conversions added to the optical network, recalculating the DFR for the optical network and the random demand set.

Additional disclosed aspects include a network management system for determining utilization efficiencies of optical networks. The network management system may include a processor enabled to access a memory media storing instructions executable by the processor to, based on a network topology for an optical network, the network topology specifying nodes in the optical network and links between the nodes, while each link provides a plurality of wavelength slots. The instructions may be executable to implement any embodiment of the methods and operations disclosed herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENTS

Figure 1:
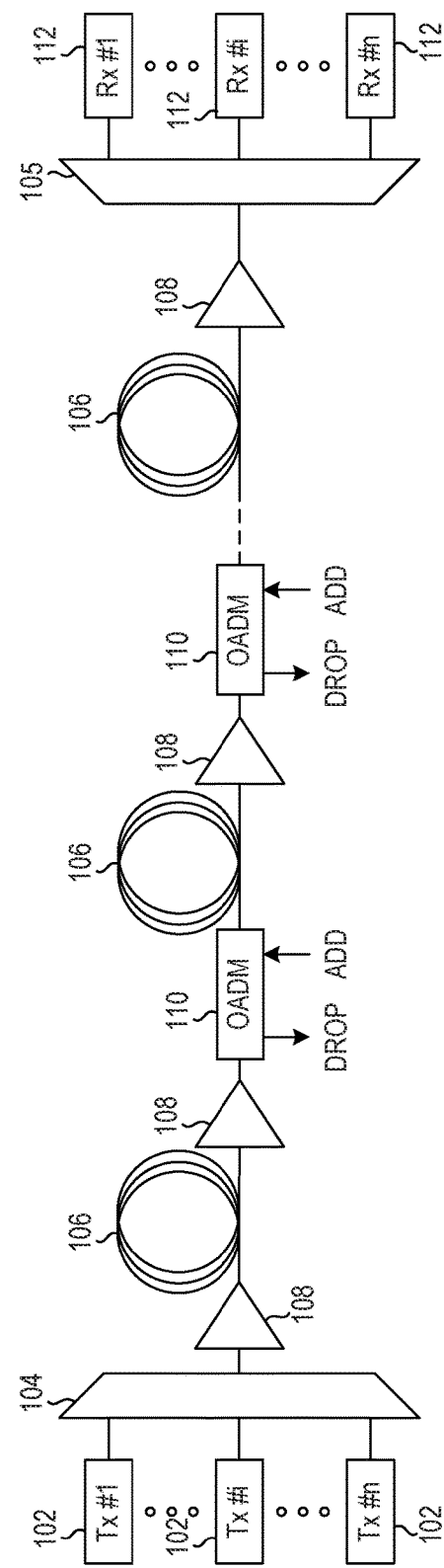
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

A high utilization efficiency is important for optical networks in order to maintain a high economic performance. The economic performance of an optical network may depend upon demands for optical paths (representing potential revenue sources) that can be satisfied with a finite network capacity (representing potential expenditures and investments). The utilization efficiency may be affected by many factors. Different routing and wavelength slot assignment algorithms used in optical networks may affect the utilization efficiency. Different traffic demand sets and network topologies may result in different utilization efficiencies. Furthermore, the availability of different transmission technologies, such as wavelength conversion, may also affect the utilization efficiency.

As noted, various conventional methods of calculating utilization efficiency for optical networks are known. For example, a blocking rate for demands is calculated based on a number of blocked demands relative to a total number of demands. In another example, a network load is calculated based on a total used capacity of the optical network relative to a total capacity. However, it can be shown that such conventional metrics for determining utilization efficiency may not result in an economically effective comparison among different optical networking solutions, such as different wavelength assignment algorithms for a given network topology.

As will be described in further detail below, methods for determining optical network utilization efficiency are disclosed. The methods for determining optical network utilization efficiency disclosed herein may provide an optical network traffic demand generator to generate a random demand set that is computationally efficient and includes demands for every single wavelength slot in a given optical network topology, thereby providing a 100% fill of the wavelength slots. The methods for determining optical network utilization efficiency disclosed herein may provide a demand fill ratio (DFR) that is an improved metric for evaluating network utilization efficiency and for comparing network utilization efficiency for wavelength assignment algorithms within a given network topology.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of sub-carrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 2) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may be used to implement methods for determining optical network utilization efficiency. In particular, a given topology of optical transport network 101, for example, for a given implementation of optical transport network 101, may be used to calculate a random demand set and a DFR based on the random demand set, as described in further detail below.

Figure 2:
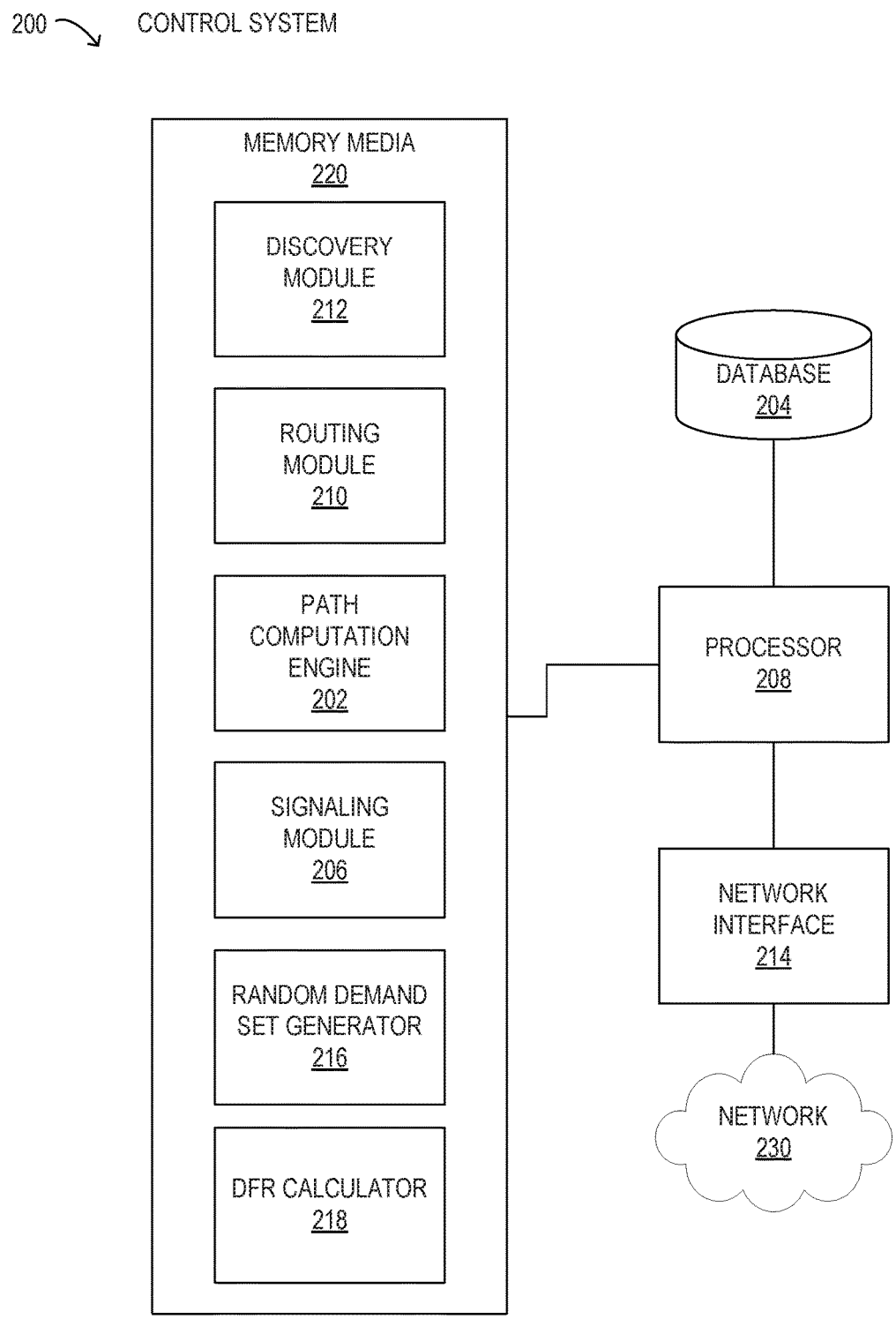
FIG. 2 is a block diagram of selected elements of an embodiment of an optical control plane system.

Referring now to FIG. 2, a block diagram of selected elements of an embodiment of control system 200 for implementing control plane functionality in optical networks, such as, for example, in optical transport network 101 (see FIG. 1), is illustrated. A control plane (or network management system) may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (such as executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. Memory media 220 as shown also includes random demand set generator 216 and DFR calculator 218, which may include sets or sequences of instructions that may represent executable computer programs for executing methods for determining optical network utilization efficiency, as disclosed herein.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, control system 200 may be configured to interface with a person (a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, random demand set generator 216 may be used to generate a random demand set for a given network topology. The random demand set generated by random demand set generator 216 may have a 100% fill for wavelength slots in the corresponding network topology. Based on the random demand set, DFR calculator 218 may be used to calculate DFR for the network topology. In this manner, DFR may be used to effectively compare network utilization efficiency for different wavelength assignment algorithms within a given network topology.

Figure 3A:
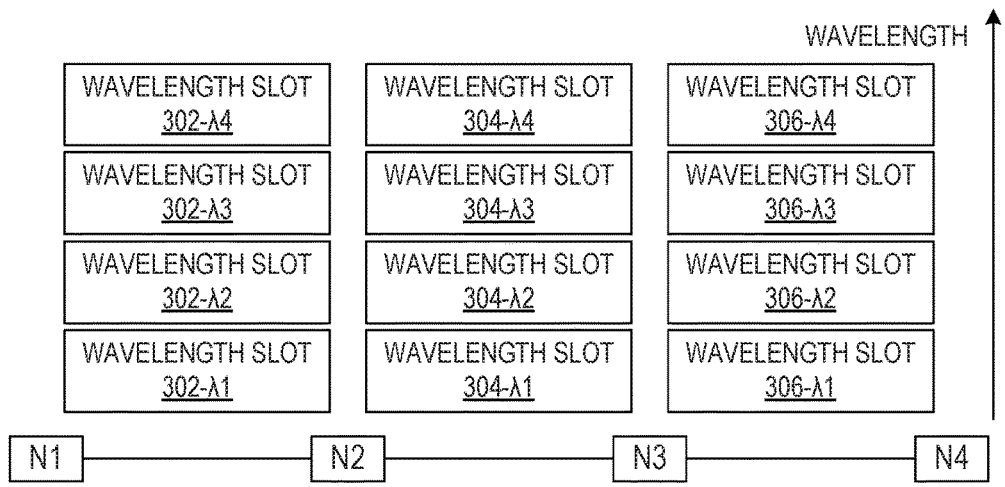
FIGS. 3A and 3B are block diagrams of selected elements of different embodiments of an optical network topology.
Figure 3B:
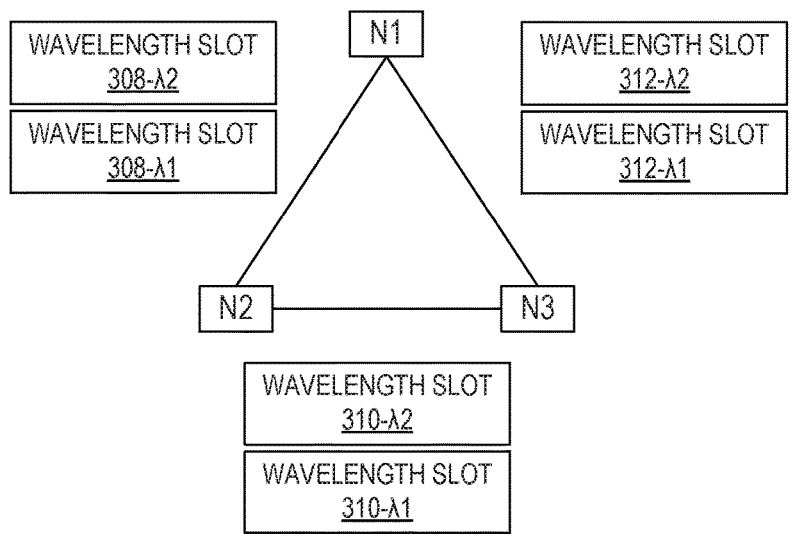

Referring now to FIGS. 3A and 3B, respective optical network topologies 300 and 301 are shown in block diagram form. Network topologies 300 and 301 are example topologies for descriptive purposes. Network topologies 300 and 301 may be represented using corresponding network topology information and may be embodied as data or data structures associated with a physical optical network. In particular embodiments, the methods for determining optical network utilization efficiency disclosed herein may be executed on various different kinds of network topologies, without limitation, including linear, mesh, and ring topologies.

In FIG. 3A, optical network topology 300 is a linear topology having 4 nodes (N1, N2, N3, and N4) with up to 4 wavelength slots assigned to each link between pairs of nodes. Thus, in optical network topology 300, wavelength slots 302-λ1, 302-λ2, 302-λ3, and 302-λ4 are wavelength slots for the link N1-N2; wavelength slots 304-λ1, 304-λ2, 304-λ3, and 304-λ4 are wavelength slots for the link N2-N3; and wavelength slots 306-λ1, 306-λ2, 306-λ3, and 306-λ4 are wavelength slots for the link N3-N4. In optical network topology 300, wavelengths may be assumed to increase in value going upwards, for example, in a sequence λ1, λ2, λ3, λ4. In various embodiments, the wavelengths λ1, λ2, λ3, λ4 are spectrally adjacent wavelengths.

From optical network topology 300, a random demand set may be generated by first generating a list (or set or collection) of all node pair candidates for the given network topology, which is referred to herein as a "node pair set". The node pair set for optical network topology 300 is given below in Table 1.

TABLE 1

The node pair set for optical network topology 300.

| NODE PAIRS | NR. HOPS |
|---|---|
| N1-N2 | 1 |
| N1-N3 | 2 |
| N1-N4 | 3 |
| N2-N3 | 1 |
| N2-N4 | 2 |
| N3-N4 | 1 |

In Table 1, NR. HOPS refers to the number of links between each node pair (i.e. a "hop").

In FIG. 3B, optical network topology 301 is a ring topology having 3 nodes (N1, N2, and N3) with up to 2 wavelength slots assigned to each link between pairs of nodes. Thus, in optical network topology 301, wavelength slots 308-λ1 and 308-λ2 are wavelength slots for the link N1-N2; wavelength slots 310-λ1 and 310-λ2 are wavelength slots for the link N2-N3; and wavelength slots 312-λ1 and 312-λ2 are wavelength slots for the link N3-N1. In optical network topology 301, wavelengths may be assumed to increase in value in a sequence λ1 to λ2. In some embodiments, the wavelengths λ1 and λ2 are spectrally adjacent wavelengths. The node pair set for optical network topology 301 is given below in Table 2.

TABLE 2

The node pair set for optical network topology 301.

| NODE PAIRS | NR. HOPS |
|---|---|
| N1-N2 | 1 |
| N1-N3 | 1 |
| N2-N3 | 1 |
| N1-(N2-)N3 | 2 |
| N1-(N3-)N2 | 2 |
| N2-(N1-)N3 | 2 |

As listed in Table 2, there is a single hop and a double hop possibility to connect any given node pair in the ring topology of optical network topology 301.

Figure 4A:
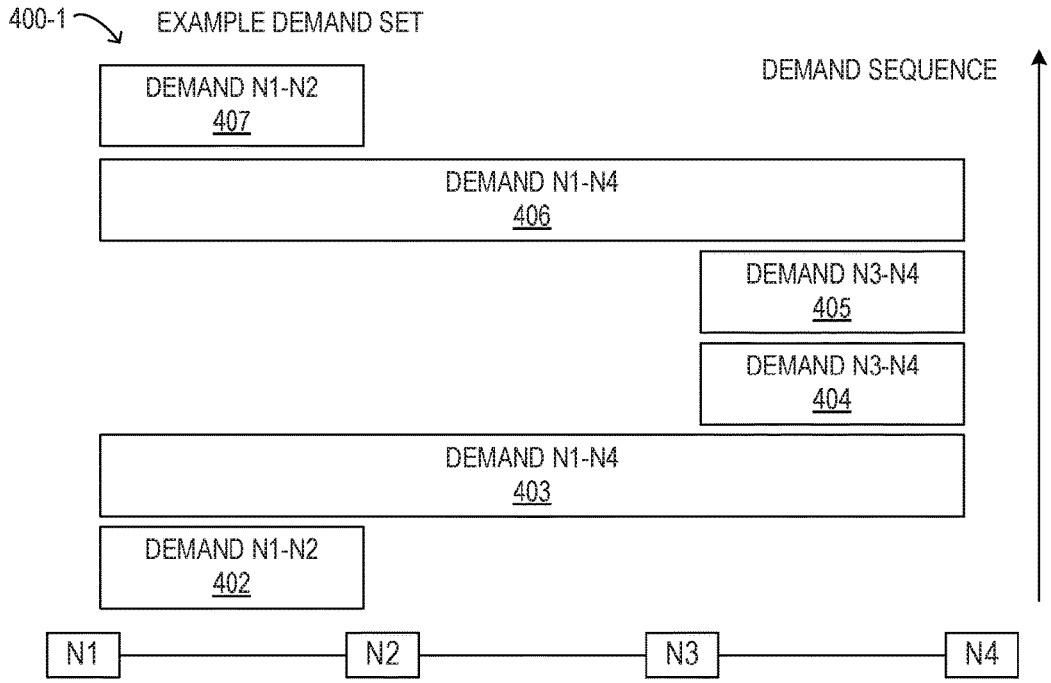
FIGS. 4A and 4B are block diagrams of selected elements of different embodiments of an example demand set.

Referring now to FIG. 4A, an example demand set 400-1 is shown in block diagram form. Example demand set 400-1 is based on optical network topology 300 (see FIG. 3A) but with two wavelength slots per hop (λ1 and λ2). In FIG. 4A, example demand set 400-1 is shown having a demand sequence going upwards, representing an order in which the demands are received. Example demand set 400-1 includes 6 demands (4 demands for a single hop, and 2 demands for a triple hop). Example demand set 400-1 may be generated by a conventional approach that randomly selects each node to randomly generate node pairs, instead of using the node pair set in Table 1.

As noted previously, conventional metrics may not adequately capture the network utilization efficiency for a given network topology. For example, a blocking rate may be calculated as a ratio of a number of blocked demands to a total number of demands. The blocking rate may be used to represent how well demands are accommodated.

In an example implementation of calculating a blocking rate, example demand set 400-1 is applied to optical network topology 300 having two wavelength slots per hop (λ1 and λ2). For this example, the demand sequence is disregarded and two different wavelength assignment algorithms are used for comparison. Wavelength assignment algorithm A specifies first populating the demands for the longest paths in network topology 300 (longest hop first). Thus, wavelength assignment algorithm A will first populate demand N1-N4 403 and demand N1-N4 406, which will occupy all the available wavelength slots. As a result, wavelength assignment algorithm A will block demand N1-N2 402, demand N3-N4 404, demand N3-N4 405, and demand N1-N2 407. Thus, the blocking rate for wavelength assignment algorithm A is 4 blocked demands/6 total demands=66% with 100% network load of optical network topology 300 having two wavelength slots per hop.

Using example demand set 400-1, wavelength assignment algorithm B specifies first populating the demands for the shortest paths in network topology 300 (shortest hop first). Thus, wavelength assignment algorithm B will first populate demand N1-N2 402, demand N3-N4 404, demand N3-N4 405, and demand N1-N2 407 and will occupy the available wavelength slots except for 2 wavelength slots N2-N3, which cannot accommodate the remaining demands N1-N4 403 and N1-N4 406. As a result, wavelength assignment algorithm B will block demand N1-N4 403 and demand N1-N4 406. Thus, the blocking rate for wavelength assignment algorithm B is 2 blocked demands/6 total demands=33% with 66% network load of optical network topology 300 having two wavelength slots per hop.

Based on example demand set 400-1, wavelength assignment algorithms A and B reveal that a low blocking rate does not necessarily lead to an efficient network utilization. For example, wavelength assignment algorithm B has a lower blocking rate, but wavelength assignment algorithm A results in a higher network load. Thus, the blocking rate may not be useful for evaluating network utilization efficiency in some cases.

Figure 4B:
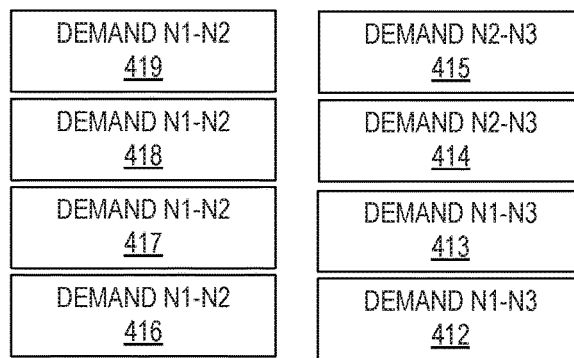

Referring now to FIG. 4B, an example demand set 400-2 is shown in block diagram form. Example demand set 400-2 is based on optical network topology 301 (see FIG. 3B) with two wavelength slots per hop (λ1 and λ2), which is a ring topology. Example demand set 400-2 includes 8 demands that may be accommodated using a single hop or a double hop in optical network topology 301. Example demand set 400-2 may be generated by a conventional approach that randomly selects each node to randomly generate node pairs, instead of using the node pair set in Table 2. As noted previously, conventional metrics may not adequately capture the network utilization efficiency for a given network topology. For example, a network load may be calculated as a ratio of a total used network capacity to a total network capacity. The network load may be used to represent how well network capacity is actually used.

In an example implementation of calculating a network load, example demand set 400-2 is applied to optical network topology 301, which is a 3 node ring topology having two wavelength slots per hop (λ1 and λ2). For this example, a demand sequence is disregarded and two different wavelength assignment algorithms are used for comparison. A wavelength assignment algorithm C specifies first populating the demands for k-shortest paths in network topology 301 (shortest hops with the largest k selected first, where k is the number of identical demands). In this case, the demands N1-N2 416, 417, 418, 419 have k=4 and will be populated first by the k-shortest path algorithm, because there are more N1-N2 demands (4×) than any other given demand. Thus, wavelength assignment algorithm C will first attempt to populate demands N1-N2 416, 417, 418, 419, before any other demands are considered. For example, demands N1-N2 416, 417 may be assigned first to the single hop between N1-N2 using wavelength slots 308-λ1 and 308-λ2, respectively, using one hop per demand. At this point, the only remaining path between N1 and N2 is N1-N3-N2, which consumes two hops per demand. So then, wavelength assignment algorithm C will assign demands N1-N2 418, 419 to N1-N2-N3, by assigning wavelength slots 312-λ1 and 310-λ1 to demand N1-N2 418, and by assigning wavelength slots 312-λ2 and 310-λ2 to demand N1-N2 419, for example. Each of demands N1-N2 418, 419 will so occupy two hops, instead of one hop. Thus, wavelength assignment algorithm C will occupy all the available wavelength slots in optical network topology 301 to populate demands N1-N2 416, 417, 418, 419, because two of the N1-N2 demands will be routed using N1-N3-N2. Because all the available wavelength slots in optical network topology 301 will be occupied at this point, wavelength assignment algorithm C will subsequently block demand N1-N3 412, demand N1-N3 413, demand N2-N3 414, and demand N2-N3 415. At this point, wavelength assignment algorithm C will end. Thus, the blocking rate for wavelength assignment algorithm C is 4 blocked demands/8 total demands=50% with 100% network load of optical network topology 301.

Using example demand set 400-2, a wavelength assignment algorithm D specifies first populating the demands for the shortest hops in network topology 301 (shortest hop first). Thus, wavelength assignment algorithm D may first assign demands N1-N2 416, 417 using wavelength slots 308-λ1 and 308-λ2, respectively. Then, because the capacity between N1-N2 is no longer available, wavelength assignment algorithm D will set aside demands N1-N2 418, 419, and will next consider other pending shortest demands for assignment. In example demand set 400-2, all demands may potentially be satisfied with a single hop, so an order of assigning demands may vary. Thus, wavelength assignment algorithm D may then assign demands N1-N3 412, 413 using wavelength slots 312-λ1 and 312-λ2, respectively. Wavelength assignment algorithm D may then assign demands N2-N3 414, 415 using wavelength slots 310-λ1 and 310-λ2, respectively. At this point, all the available wavelength slots in network topology 301 will be occupied. As a result, wavelength assignment algorithm D will then block demands N1-N2 418, 419, which would consume a third and fourth wavelength slot at N1-N2, which is not available in network topology 301. At this point, wavelength assignment algorithm D will end. Thus, the blocking rate for algorithm D is 2 blocked demands/8 total demands=25% with 100% network load of optical network topology 301. It is noted that an order of assigning demands may vary when using wavelength assignment algorithm D, but wavelength assignment algorithm D will lead to the same result as described above with any order of demand processing for demand set 400-2.

Based on example demand set 400-2, wavelength assignment algorithms C and D reveal that a high network load does not necessarily lead to an efficient network utilization. For example, wavelength assignment algorithm C has a higher blocking rate with the same 100% network load, indicating an inefficient use of network capacity, since two of the N1-N2 demands will be routed using N1-N3-N2, thereby occupying two wavelength slots each. Thus, the network load may not be useful for evaluating network utilization efficiency in some cases.

As shown in the above wavelength assignment algorithms A, B, C, and D, values such as blocking rate and network load may not provide insightful measurements of network utilization efficiency in some cases. For example, a wavelength assignment algorithm can achieve a nominal low blocking rate by intentionally blocking more difficult demands, such as longer hop demands. In another example, a wavelength assignment algorithm can achieve a nominal high network load by occupying excessive network capacity, such as by routing shorter demands along longer hops. Thus, with metrics such as blocking rate and network load, different traffic demands may lead to different results for network utilization efficiency, which is not desired. Some particularly disadvantageous characteristics of metrics such as blocking rate and network load are that demands are generated in an arbitrary manner and the characteristics of the demands are not reflected by the metrics. Thus the metrics do not reveal what type of demands were blocked or how the network capacity was actually used.

Figure 5A:
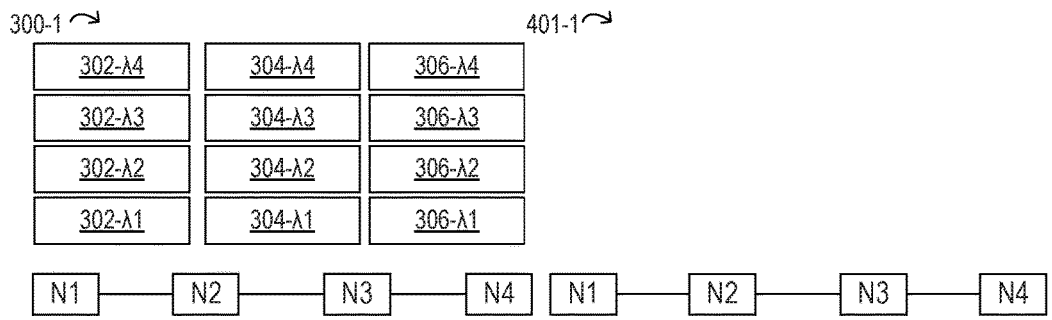
FIGS. 5A, 5B, 5C, 5D, 5E, 5F, 5G, 5H, and 5I are block diagrams of selected elements of an embodiment of a random demand set.
Figure 5B:
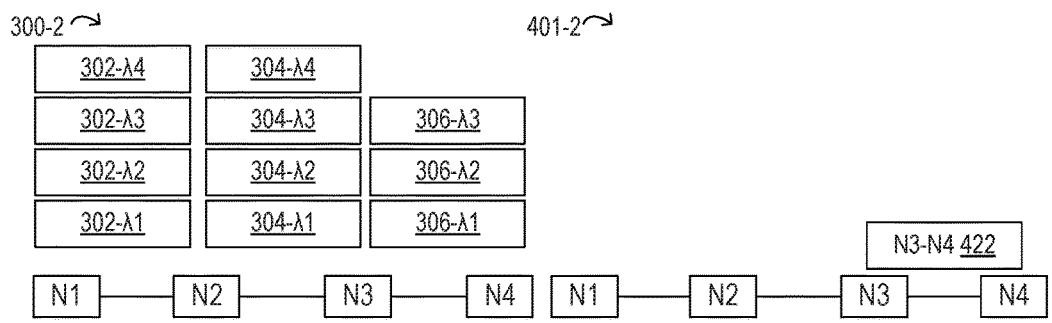
Figure 5C:
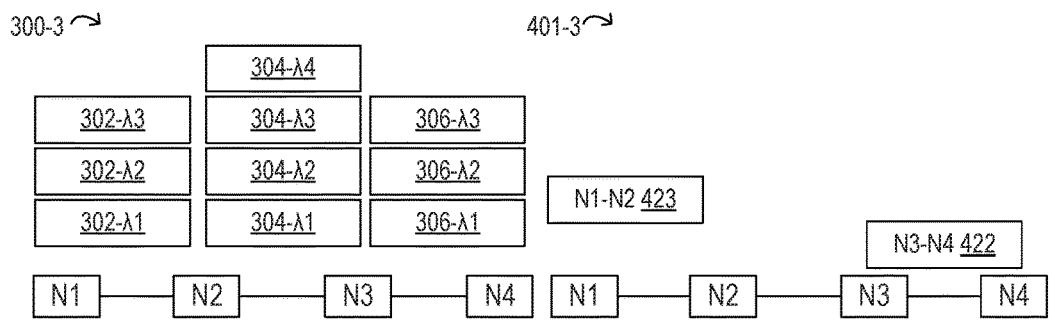
Figure 5D:
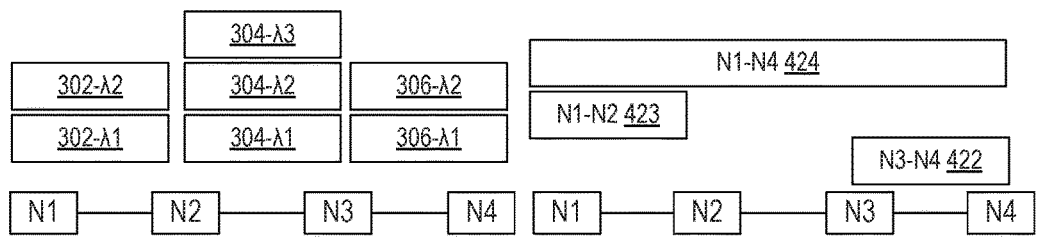
Figure 5E:
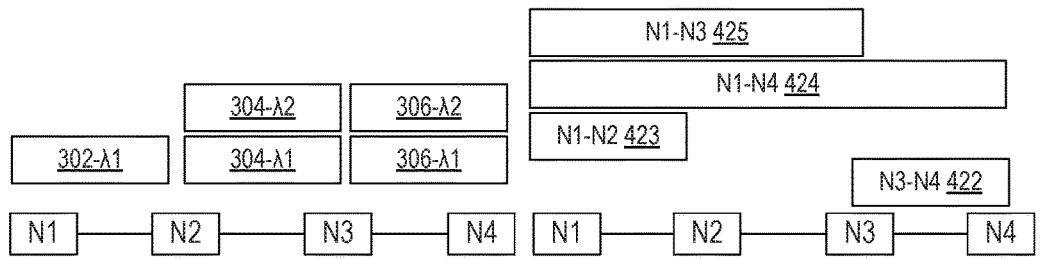
Figure 5F:
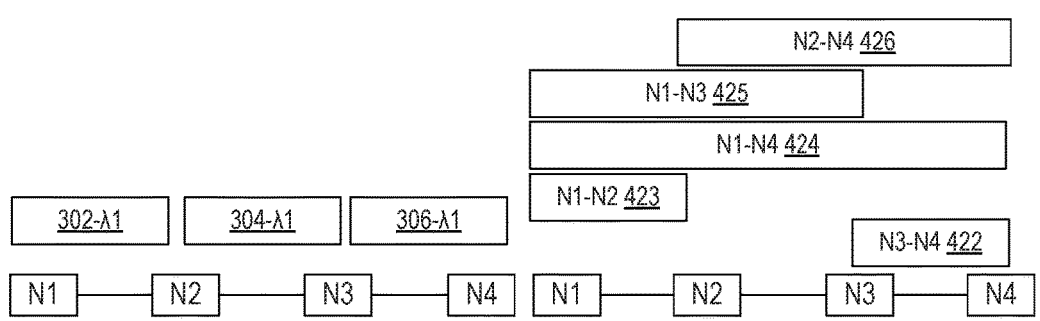
Figure 5G:
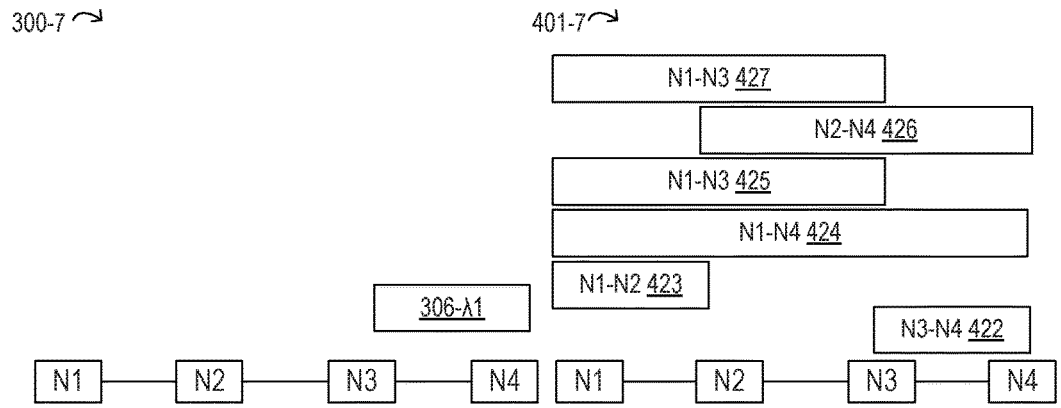
Figure 5H:
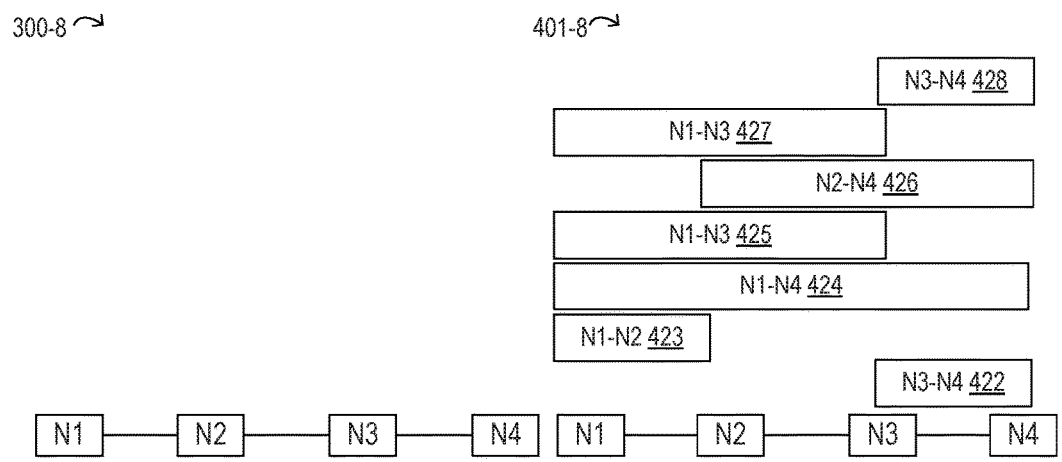
Figure 5I:
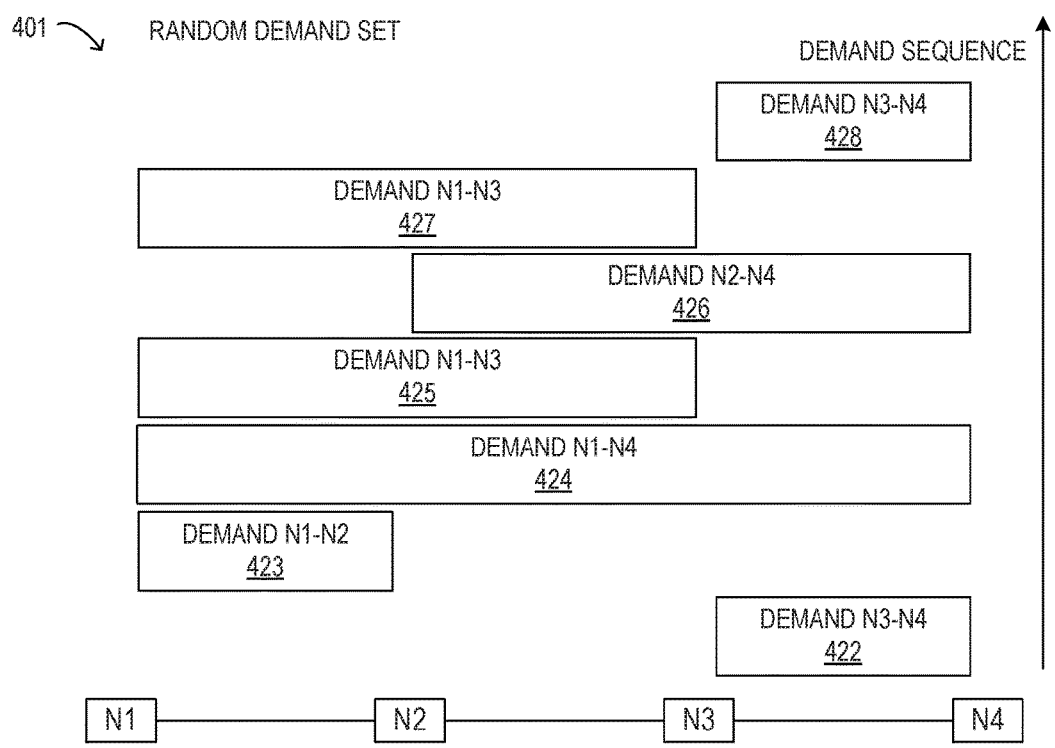

Referring now to FIGS. 5A, 5B, 5C, 5D, 5E, 5F, 5G, 5H, and 5I, the generation of a random demand set 401 is shown successively stepwise in block diagram form. Random demand set 401 is based on optical network topology 300 (see FIG. 3A) with four wavelength slots per hop. In given embodiments, random demand set 401 may be generated using random demand set generator 216 (see FIG. 2). As explicitly indicated in FIGURE SI, random demand set 401 is shown having a demand sequence going upwards, representing an order in which the demands are received. Accordingly, random demand set 401 is shown being generated according to the demand sequence. Random demand set 401 includes 7 demands (3 demands for a single hop, 3 demands for a double hop, and 1 demand for a triple hop). Random demand set 401 is a randomly generated demand set and includes demands that occupy 100% of the wavelength slots available in optical network topology 300. Thus in FIG. 5I, each hop between nodes in random demand set 401 is filled with exactly 4 demands, corresponding to 4 available wavelength slots per hop in optical network topology 300. The demands in random demand set 401 may specify one or more hops. Random demand set 401 is representative of any number of demand sets that may be randomly generated using optical network topology 300, as described herein. Accordingly, any random demand set, including random demand set 401, may represent a given set of randomly selected demands that could potentially be selected in any demand sequence. As shown in FIG. 5I, random demand set 401 includes demands in the following demand sequence: demand N3-N4 422; demand N1-N2 423; demand N1-N4 424; demand N1-N3 425; demand N2-N4 426; demand N1-N3 427; and demand N3-N4 428.

In FIGS. 5A, 5B, 5C, 5D, 5E, 5F, 5G, 5H, the process of selecting wavelength slots based on randomly selected node pairs from the node pair set, such as listed Table 1 above, to generate random demand set 401 will now be explained successively in a stepwise manner. As some node pairs are randomly selected, the corresponding wavelength slots are removed from optical network topology 300 and added to random demand set 401, such that the number of available wavelength slots in optical network topology 300 for subsequent demands will decrease. When a next potential node pair is then randomly selected from the node pair set (which does not change), the next potential node pair may be invalid, if the wavelength slots associated with the node pair have already been allocated to a previously generated demand in random demand set 401. In this manner, random demand set 401 is generated from the node pair set in Table 1. It is noted that some possible node pairs are not present in random demand set 401 as a result of the random selection and 'consumption' of available wavelength slots. It will also be understood that optical network topology 300 as well as random demand set 401 may be represented by information, or data, that can be processed and manipulated using data processing techniques. For example, random demand set generator 216 may process information associated with optical network topology 300 and random demand set 401 to generate random demand set 401, as described below in further detail.

Conventional approaches to generating demand sets have added demands based on selection of random individual nodes to then subsequently form pairs to specify a demand. However, random individual node selection may result in a computationally intractable operation that can take a very long time to compute for large scale networks with large numbers of nodes and potential node pairs. Instead of a conventional approach, random demand set 401 is generated by first generating the node pair set for optical network topology 300. An example of a randomly selected node pair set for optical network topology 300 is shown above in Table 1.

In FIG. 5A, an initialization state of the process of generating random demand set 401 is shown. Specifically, the process begins as shown in FIG. 5A, with optical network topology 300-1 being filled will all available wavelength slots, and random demand set 401-1 being an empty set with no added demands.

In FIG. 5B, a first node pair is selected at random from the node pair set (see Table 1), in this case N3-N4 422. Using a reverse first-fill approach, wavelength slot 304-$\lambda$4 is assigned from optical network topology 300-2 to demand N3-N4 422, which populates random demand set 401-2.

In FIG. 5C, a second node pair is selected at random from the node pair set (see Table 1), in this case N1-N2 423. Then, wavelength slot 302-$\lambda$4 is assigned from optical network topology 300-3 to demand N1-N2 423, which populates random demand set 401-3.

In FIG. 5D, a third node pair is selected at random from the node pair set (see Table 1), in this case N1-N4 424. Then, wavelength slots 302-$\lambda$3, 304-$\lambda$4, and 306-$\lambda$3 are assigned from optical network topology 300-4 to demand N1-N4 424, which populates random demand set 401-4.

In FIG. 5E, a fourth node pair is selected at random from the node pair set (see Table 1), in this case N1-N3 425. Then, wavelength slots 302-$\lambda$2 and 304-$\lambda$3 are assigned from optical network topology 300-5 to demand N1-N3 425, which populates random demand set 401-5.

In FIG. 5F, a fifth node pair is selected at random from the node pair set (see Table 1), in this case N2-N4 426. Then, wavelength slots 304-$\lambda$2 and 306-$\lambda$2 are assigned from optical network topology 300-6 to demand N2-N4 426, which populates random demand set 401-6.

In FIG. 5G, a sixth node pair is selected at random from the node pair set (see Table 1), in this case N1-N3 427. Then, wavelength slots 302-$\lambda$1 and 304-$\lambda$1 are assigned from optical network topology 300-7 to demand N1-N3 427, which populates random demand set 401-7.

In FIG. 5H, a seventh node pair is selected at random from the node pair set (see Table 1), in this case N3-N4 428. Then, wavelength slots 306-$\lambda$1 is assigned from optical network topology 300-8 to demand N3-N4 428, which populates random demand set 401-8.

In FIG. 5I, after all wavelength slots in optical network topology 300-8 are assigned, random demand set 401-8 is complete and shown as random demand set 401. It is noted that the random selection process for node pairs described above may reject different invalid node pairs upon random selection, where an invalid node pair would consume a wavelength slot that is no longer available in optical network topology 300 at the moment of selection. Any number of randomly selected node pairs may be invalid node pairs during the selection process, which may repeat random selection until a valid node pair is selected.

Although not shown in FIG. 5I for descriptive clarity, each demand may also include additional information, such as a shortest path between the pair of nodes, a number of wavelength slots between the pair of nodes, a maximum number of wavelength conversions between the pair of nodes, and traffic capacity information for each of the wavelength slots, such as a modulation format and a modulation rate.

In some embodiments, additional criteria may be applied for the selection of node pairs to generate random demand set 401. For example, the demand selection may be weighted to reflect a certain demand pattern, such as a high number or fraction of demands for a particular node pair, a high number or fraction of demands for longer hop demands, a high number or fraction of demands for shorter hop demands, among other demand patterns. In this manner, random demand set 401 having the particular properties described above may be generated and may be used to evaluate different wavelength assignment algorithms for optical network topology 300, as an example of the given network topology.

Figure 6A:
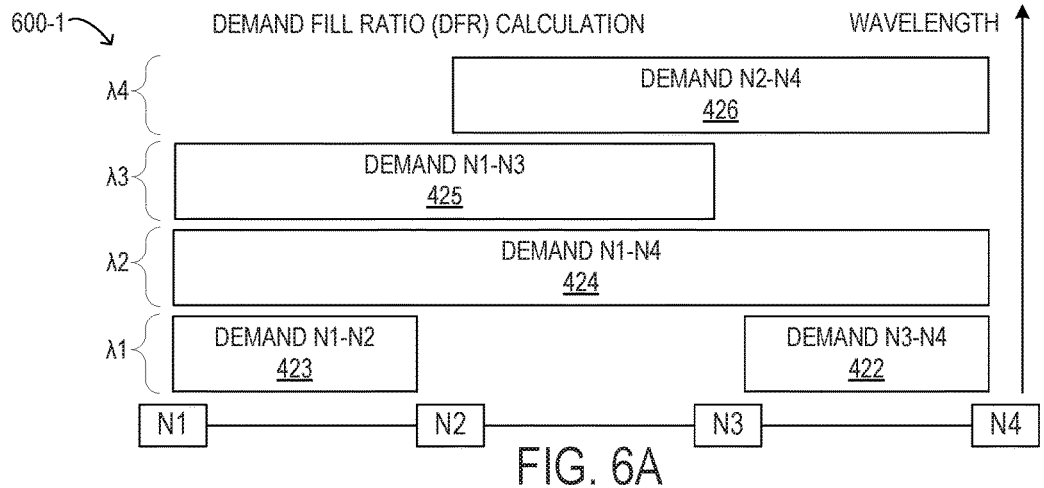
FIGS. 6A, 6B, and 6C are block diagrams of selected elements of an embodiment of a demand fill ratio (DFR) calculation.
Figure 6B:
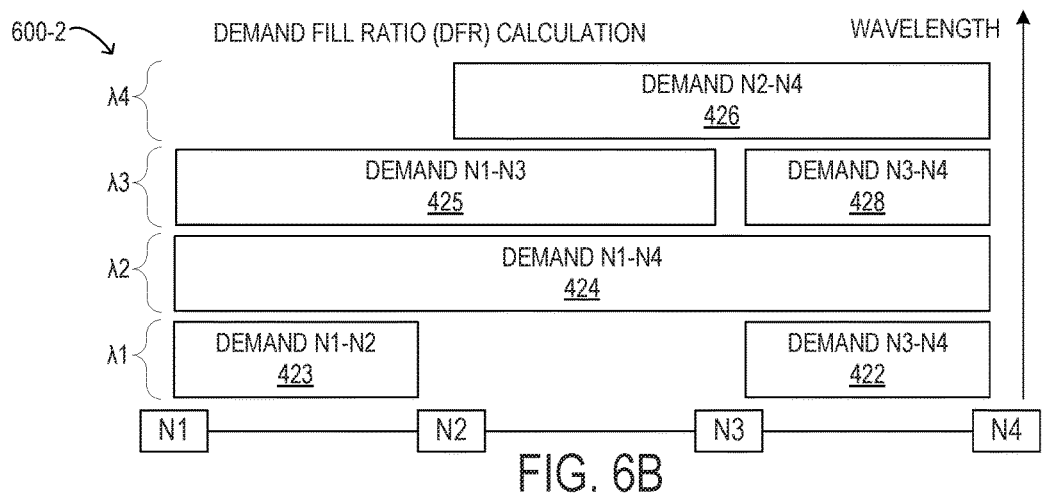
Figure 6C:
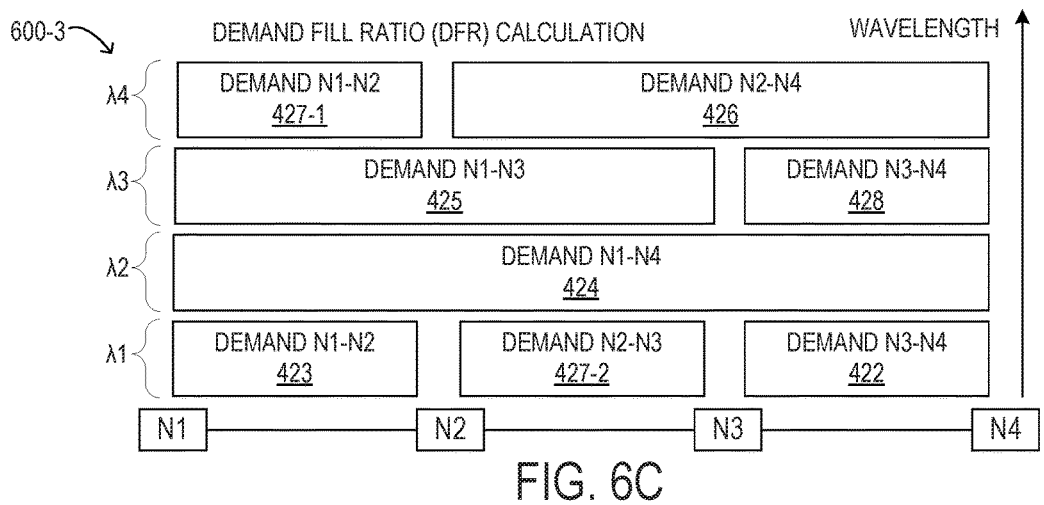

Referring now to FIGS. 6A, 6B, and 6C, a DFR calculation 600 is shown in block diagram form. DFR calculation 600 is based on optical network topology 300 (see FIG. 3A) with four wavelength slots per hop and random demand set 401 (see FIG. 5I). In given embodiments, DFR calculation 600 may be performed using DFR calculator 218 (see FIG. 2). DFR calculation 600, in conjunction with random demand set 401, may be used to measure a capacity ratio of demands that actually have populated the wavelength slots in a given network topology (e.g., optical network topology 300) according to a given wavelength assignment algorithm. In DFR calculation 600, a first fit wavelength assignment is used. Thus, DFR calculation 600 focuses on the demands and the total capacity of the network, because random demand set 401 has already been designed with 100% fill capacity of the network topology. DFR calculation 600 is performed after as many demands as possible are assigned from random demand set 401 according to the demand sequence. Although DFR calculation 600 should ideally result in a DFR=1, actual DFR values may be less than 1 due to spectrum fragmentation, random selection of node pairs, as well as other factors such as path routing, modulation formats, or other restrictions on wavelength slots.

To perform DFR calculation 600, a network topology corresponding to optical network topology 300 is emptied of wavelength slot assignments. Because optical network topology 300 is embodied as optical network topology information, the wavelength slot assignments may be a logical set of information that can be modified. Then, the demands in random demand set 401 are assigned to optical network topology 300 according to the demand sequence. A first-fit wavelength assignment is used, although different wavelength assignment algorithms may be used and compared, for example. It is noted that different wavelength assignment algorithms may be used in different embodiments. The first fit assignment is used with continuous wavelength slots, representing a single wavelength channel for assigning to the demand between the specified node pairs.

As shown in FIG. 6A, assignment of the demands begins with demand N3-N4 422, demand N1-N2 423, demand N1-N4 424, demand N1-N3 425, and demand N2-N4 426, according to the demand sequence as shown in FIG. 5I. The resulting fill of the demands into optical network topology 300 is shown as DFR calculation 600-1 in FIG. 6A.

Then, the next demand according to the demand sequence is demand N1-N3 427, which will be blocked because no continuous wavelength slot N1-N3 is available as shown in DFR calculation 600-1. Thus, demand N1-N3 427 may be added to a blocked demand set (not shown, see FIG. 6C) and may be considered later for discontinuous wavelength slots using a wavelength conversion node. Then, as shown in FIG. 6B, demand N3-N4 428 may be assigned according to the demand sequence in DFR calculation 600-2. Then DFR calculation 600-2 may be used to calculate DFR (for continuous wavelength assignment only, no wavelength conversion) according to DFR=(assigned wavelength slots)/(total wavelength slots). With 10 of 12 wavelength slots occupied (excluding demand N1-N3 427 which was blocked without wavelength conversion), DFR=0.83.

As shown in FIG. 6C, the blocked demands leftover after DFR calculation 600-2 is performed without wavelength conversion may be added by adding one or more wavelength conversion nodes to optical network topology 300. The wavelength conversion nodes may be optical-electrical-optical wavelength conversion (OEO-WC) nodes, or all optical wavelength conversion nodes (AO-WC). For example, in DFR calculation 600-3, a wavelength conversion node (not shown) may be added to node N2 to accommodate demand N1-N3 427, which was previously blocked. Using a discontinuous wavelength slot (corresponding with wavelength slot 302-λ4 to wavelength slot 304-λ1), demand N1-N2 427-1 and demand N2-N3 427-2 may be added to assign demand N1-N3 427 with wavelength conversion at node N2. DFR calculation 600-3 results in a recalculation of DFR=1, because all available wavelength slots have been assigned.

In particular implementations, the network demands specified using DFR calculation 600 may be provisioned in an optical transport network for transmission of network traffic.

The methods described above for DFR calculation 600 were evaluated using a CORONET Continental United States (CONUS) Topology (DARPA CORONET Program on Dynamic Multi-Terabit Core Optical Networks). The CORONET is a hypothetical fiber-optic backbone network developed for use in researching large-scale DWDM networks. The location and connectivity of the nodes in CORONET mimics existing networks but is not intended to characterize actual nodes in use today. For the evaluation, 200 instances of a random demand set, such as random demand set 401, were generated for CORONET CONUS. Then DFR was used to evaluate network utilization efficiency for 2,580 demands in the random demand set using a first fit wavelength assignment algorithm. It was verified that with unlimited OEO-WCs, DFR will always reach 1, accommodating every demand in the random demand set. Additionally it was verified that DFR measures desired network utilization efficiency and shows that using AO-WCs a similar DFR as with OEO-WC may be attained but with fewer numbers of WCs.

Figure 7:
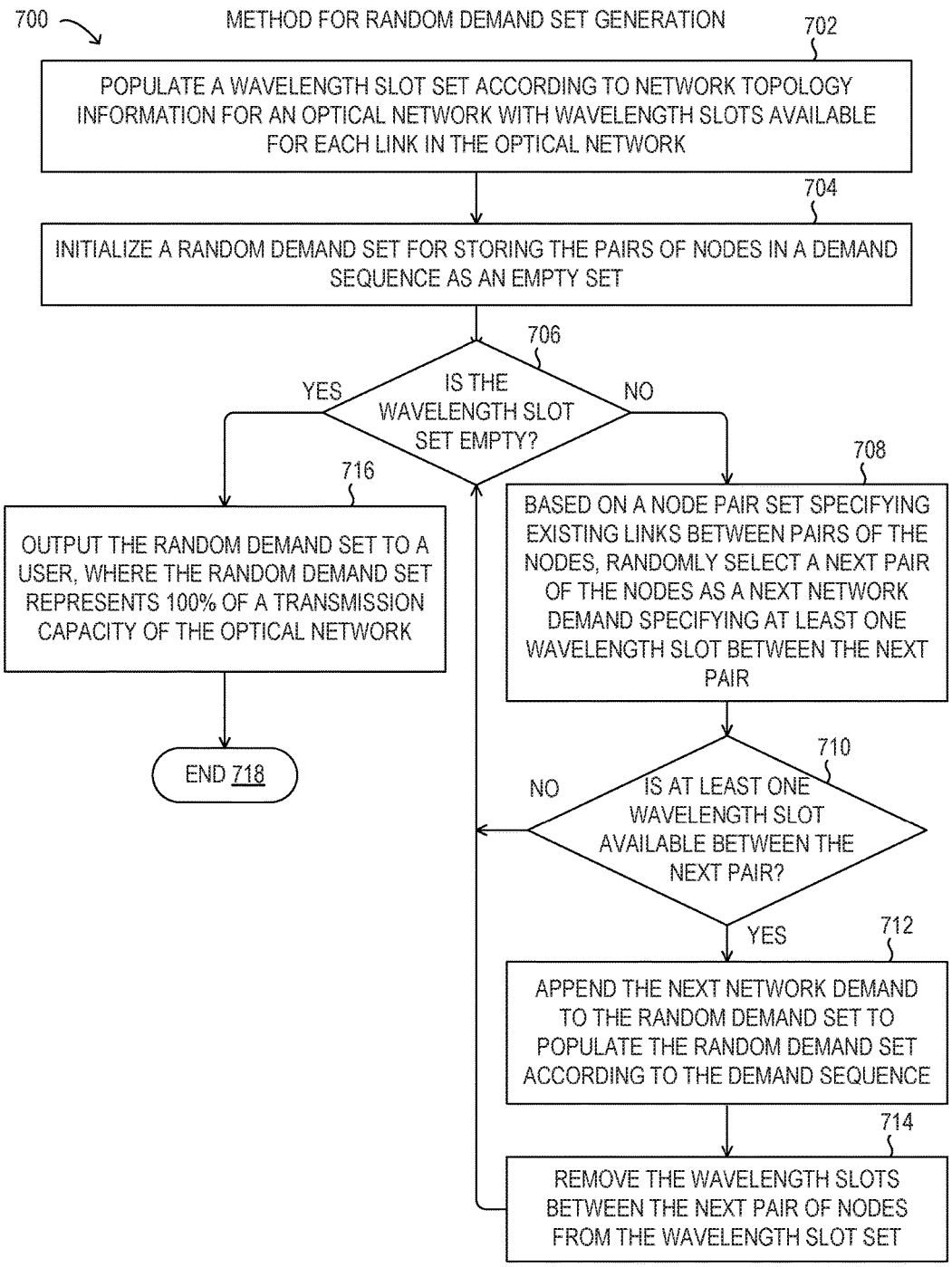
FIG. 7 is a flowchart of selected elements of an embodiment of a method for random demand set generation.

Referring now to FIG. 7, method 700 for random demand set generation is shown in flowchart form. As shown method 700 may be performed for optical transport network 101 (see FIG. 1), such as by using corresponding optical network topology information, and using random demand generator 216, among other elements in control system 200 (see FIG. 2). It is noted that operations described with respect to method 700 may be omitted or rearranged in different embodiments.

Method 700 may begin at step 702 by populating a wavelength slot set according to an optical network with wavelength slots available for each link in the optical network. The wavelength slot set is the input set for method 700 from which the demands (specified by node pairs) are selected, but the wavelength slot set is not associated with any given sequence (demand sequence) until method 700 is performed. Correspondingly, different demand sequences may be generated using the same wavelength slot set in different instances of performing method 700. Thus, the wavelength slot set may be thought of as the input set for method 700, which completes when the wavelength slot set is emptied after all wavelength slot have been selected as demands, and have been appended to the random demand set, which is an output set for method 700.

At step 704, a random demand set for storing the pairs of nodes in a demand sequence is initialized as an empty set. Step 704 is an initialization step to begin the random demand set generation of method 700 with an empty random demand set (the output set) each time method 700 is performed, as shown. The random demand set may not be empty when step 704 is performed, due to previous instances of method 700 that were performed or were interrupted before completion, for example. At step 706, a decision is made whether the wavelength slot set is empty. Step 706 determines whether method 700 continues when any wavelength slots remain unassigned from the optical network (input set is not yet empty) or whether method 700 is complete when all wavelength slots in the wavelength slot set have been assigned (input set is empty) to the random demand set (output set with a given demand sequence). When the result of step 706 is YES and the wavelength slot set is empty, at step 716, the random demand set is output to a user, where the random demand set represents 100% of a transmission capacity of the optical network. After step 716 method 700 may end at step 718. When the result of step 706 is NO and the wavelength slot set is not (yet) empty, then method 700 may proceed to continue randomly selecting remaining wavelength slots from the wavelength slot set, as described above with respect to FIGS. 5A-5I. At step 708, based on a node pair set specifying existing links between pairs of the nodes, a next pair of the nodes is randomly selected as a next network demand specifying at least one wavelength slot between the next pair. The next pair may be randomly selected in step 708 from the node pairs in the node pair set, and by excluding invalid node pairs, as described previously. At step 710 a decision is made whether at least one wavelength slot is available between the next pair. When the result of step 710 is NO, method 700 may loop back to step 706, and the next pair may be considered an invalid node pair. When the result of step 710 is YES, at step 712, the next network demand is appended to the random demand set to populate the random demand set according to the demand sequence. At step 714, the wavelength slots between the next pair of nodes are removed from the wavelength slot set. After step 714, method 700 loops back to step 706. In this manner, method 700 will iterate until all the wavelength slots in the wavelength slot set (input set) have been assigned to the random demand set (output set), corresponding to all the wavelength slots in the optical network topology being populated by network demands (100% of wavelength slots occupied).

Figure 8:
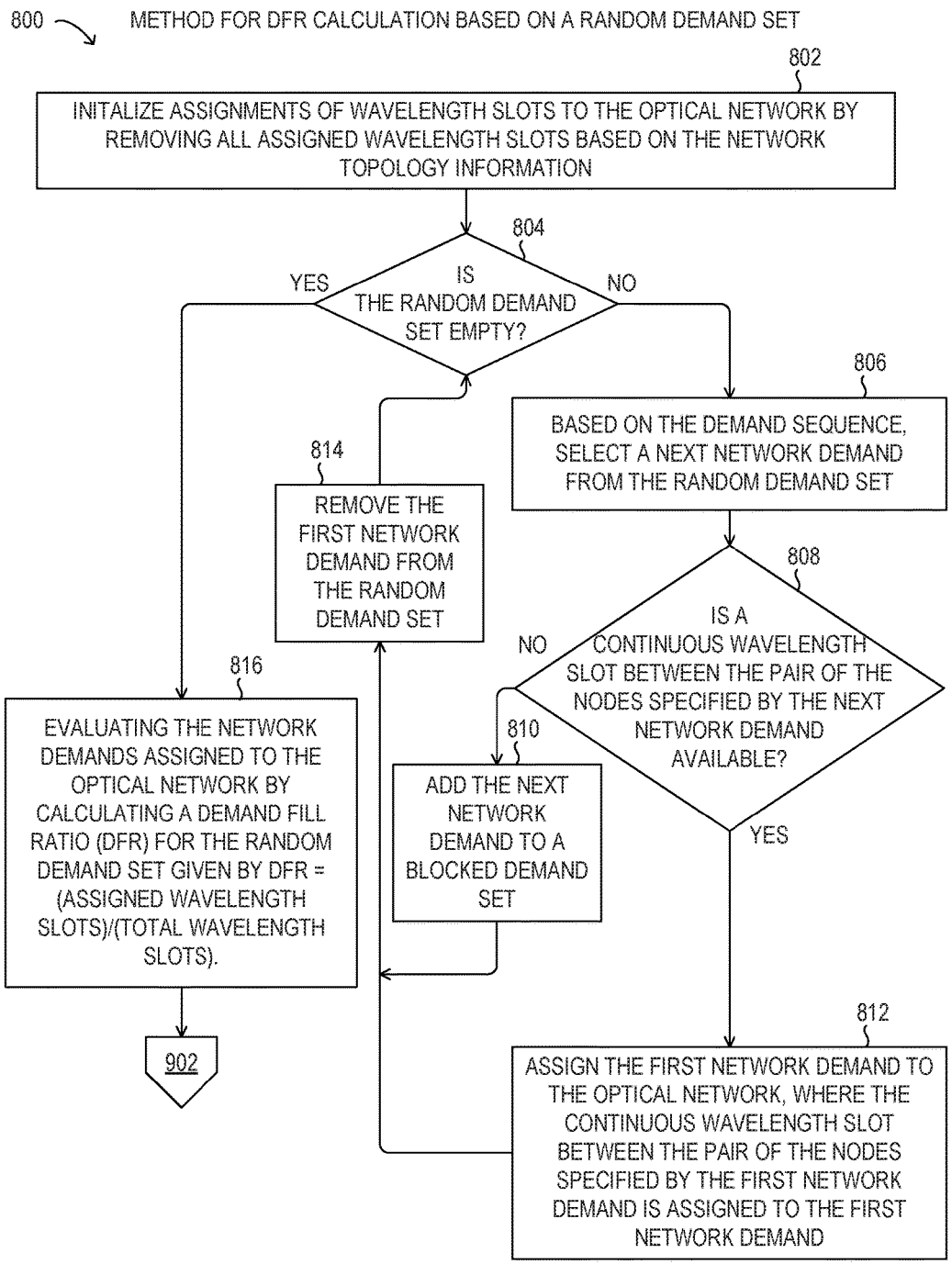
FIG. 8 is a flowchart of selected elements of an embodiment of a method for DFR calculation based on a random demand set.

Referring now to FIG. 8, method 800 for DFR calculation based on a random demand set is shown in flowchart form. As shown method 800 may be performed for optical transport network 101 (see FIG. 1), such as for a given optical network topology, using DFR calculator 218, among other elements in control system 200 (see FIG. 2). The random demand set in method 800 may be generated using method 700 (see FIG. 7). It is noted that operations described with respect to method 800 may be omitted or rearranged in different embodiments.

Method 800 may begin at step 802, by initializing assignments of wavelength slots to the optical network by removing all assigned wavelength slots based on the network topology information. At step 804, a decision is made whether the random demand set is empty. When the result of step 804 is YES and the random demand set is empty, at step 816, the network demands assigned to the network topology are evaluated by calculating a demand fill ratio (DFR) for the random demand set given by DFR=(assigned wavelength slots)/(total wavelength slots). After step 816, method 800 may proceed to step 902 in method 900 (see FIG. 9). When the result of step 804 is NO and the random demand set is not empty, at step 806, based on the demand sequence, a next network demand is selected from the random demand set. At step 808, a decision is made whether a continuous wavelength slot between the pair of the nodes specified by the next network demand is available. When the result of step 808 is NO and no continuous wavelength slot is available, at step 810, the next network demand is added to a blocked demand set. When the result of step 808 is YES and a continuous wavelength slot is available, at step 812, the next network demand is assigned to the optical network, where the continuous wavelength slot between the pair of the nodes specified by the first network demand is assigned to the first network demand. After step 812 or after step 810, at step 814, the first network demand is removed from the random demand set. After step 814, method 800 may loop back to step 804. In this manner, method 700 will iterate until all the network demands have been assigned to continuous wavelength slots without using wavelength conversion nodes in the optical network.

Figure 9:
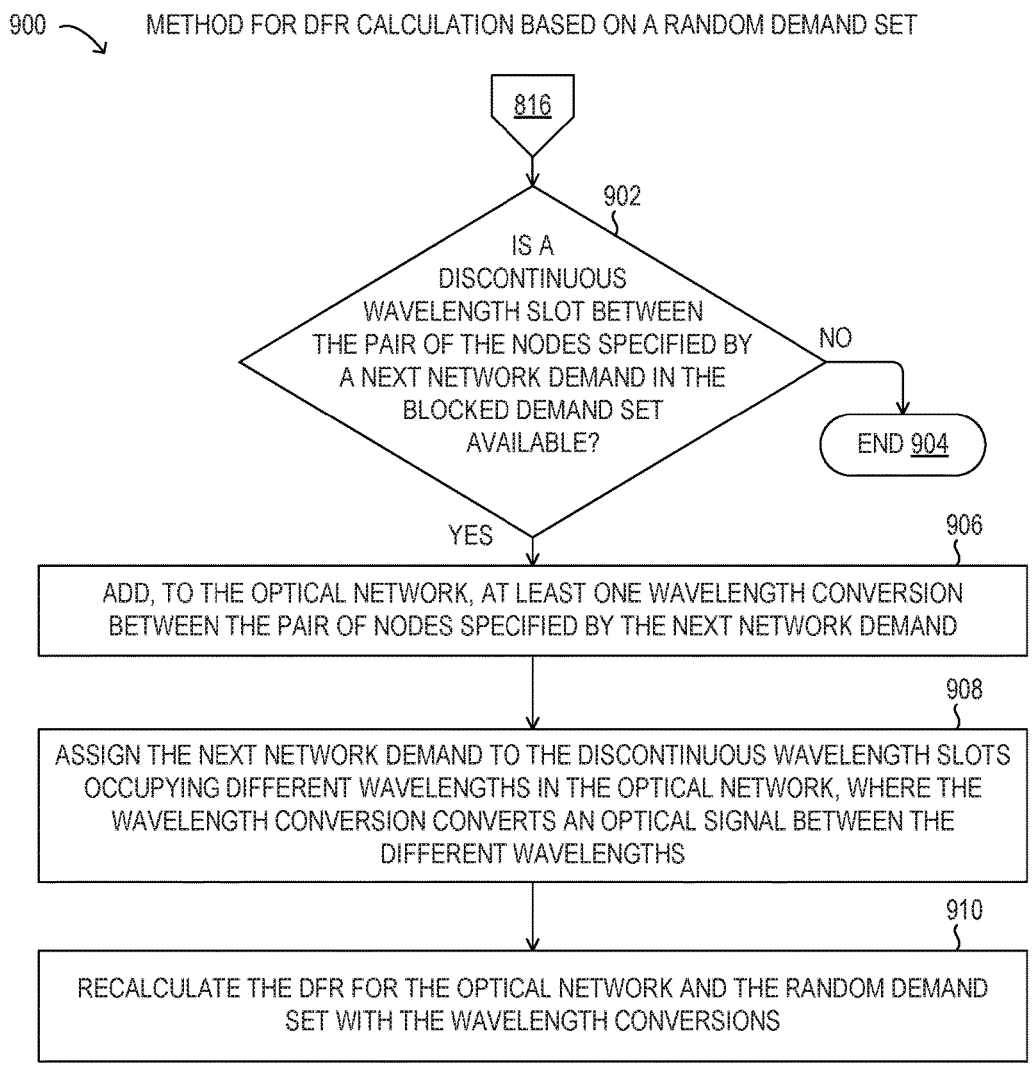
FIG. 9 is a flowchart of selected elements of an embodiment of a method for DFR calculation based on a random demand set.

Referring now to FIG. 9, method 900 for DFR calculation based on a random demand set is shown in flowchart form. As shown method 900 may be performed for optical transport network 101 (see FIG. 1), such as for a given optical network topology, using DFR calculator 218, among other elements in control system 200 (see FIG. 2). The random demand set in method 900 may be generated using method 700 (see FIG. 7). It is noted that operations described with respect to method 900 may be omitted or rearranged in different embodiments.

Method 900 may begin from step 816 in method 800 (see FIG. 8) at step 902, by making a decision whether a discontinuous wavelength slot between the pair of the nodes specified by a next network demand in the blocked demand set is available. When the result of step 902 is NO and the discontinuous wavelength slot is not available, method 900 may end at step 904. When the result of step 902 is YES and the discontinuous wavelength slot is available, at step 906, at least one wavelength conversion is added to the network topology between the pair of nodes specified by the next network demand. At step 908, the next network demand is assigned to the discontinuous wavelength slots occupying different wavelengths in the optical network, where the wavelength conversion converts an optical signal between the different wavelengths. At step 910, the DFR is recalculated for the optical network and the random demand set with the wavelength conversions.

As disclosed herein, methods and systems for determining optical network utilization efficiency include generating a random demand set and calculating a demand fill ratio (DFR) based on the random demand set. The random demand set includes network demands for a given optical network topology that provide 100% of the wavelength slots in the optical network topology. The DFR may be calculated using different wavelength assignment algorithms, such as a first fit wavelength assignment algorithm, from the randomly generated demands in the random demand set. The DFR may be calculated without and with wavelength conversion nodes.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:
1. A method comprising:
receiving network topology information for an optical network from a network control system for the optical network, the network topology information specifying nodes in the optical network and existing links between pairs of the nodes, wherein the network topology information specifies at least one wavelength slot per link;

populating a wavelength slot set according to the network topology information with wavelength slots available for each link in the optical network;

initializing a random demand set for storing the pairs of nodes in a demand sequence as an empty set;

repeating until the wavelength slot set is empty:
  based on a node pair set specifying the existing links between the pairs of the nodes, randomly selecting a next pair of the nodes as a next network demand specifying at least one wavelength slot between the next pair; and
  when at least one wavelength slot is available from the wavelength slot set between the next pair of nodes, appending the next network demand to the random demand set to populate the random demand set according to the demand sequence; and
  removing the wavelength slots between the next pair of nodes from the wavelength slot set; and after the wavelength slot set is empty, outputting the random demand set to a user, wherein the random demand set represents 100% of a transmission capacity of the optical network.

2. The method of claim 1, further comprising:
initializing assignments of the wavelength slots to the optical network by removing all assigned wavelength slots based on the network topology information;
repeating, based on the network topology information, until the random demand set is empty:
  based on the demand sequence, selecting a first network demand from the random demand set;
  if a continuous wavelength slot between the pair of the nodes specified by the first network demand is available in the optical network, using a wavelength assignment algorithm, assigning the first network demand to the optical network, wherein the continuous wavelength slot between the pair of the nodes specified by the first network demand is assigned to the first network demand;
  if no continuous wavelength slot between the pair of the nodes specified by the first network demand is available, adding the first network demand to a blocked demand set indicating network demands blocked from being assigned to the optical network; and
  removing the first network demand from the random demand set.

3. The method of claim 2, further comprising:
evaluating the network demands assigned to the optical network by calculating a demand fill ratio (DFR) for the random demand set given by DFR=(assigned wavelength slots)/(total wavelength slots).

4. The method of claim 2, further comprising:
provisioning at least one optical path according to the network demands assigned to the optical network.

5. The method of claim 2, wherein the wavelength assignment algorithm is a first fit algorithm.

6. The method of claim 1, wherein the node pair set further specifies, for each of the pair of nodes, at least one of:
  a shortest path between the pair of nodes;
  a number of wavelength slots between the pair of nodes;
  a maximum number of wavelength conversions between the pair of nodes; and traffic capacity information for each of the wavelength slots, the traffic capacity information further comprising: a modulation format and a modulation rate.

7. The method of claim 1, wherein wavelength slots are weighted according to a demand pattern, and wherein randomly selecting the next pair of the nodes further comprises:
selecting wavelength slots between the next pair of the nodes to satisfy the demand pattern.

8. The method of claim 3, further comprising:
for each of the network demands in the blocked demand set, if a discontinuous wavelength slot is available between the pair of nodes specified by the network demand:
  adding, to the optical network, at least one wavelength conversion between the pair of nodes specified by the network demand; and
  assigning the network demand to the discontinuous wavelength slots occupying different wavelengths in the optical network, wherein the wavelength conversion converts an optical signal between the different wavelengths.

9. The method of claim 8, further comprising:
with the wavelength conversions added to the optical network, recalculating the DFR for the optical network and the random demand set.

10. A network management system, comprising:
a processor enabled to access a memory media storing instructions executable by the processor for:
  determining network topology information for an optical network, the network topology information specifying nodes in the optical network and existing links between pairs of the nodes, wherein the network topology information specifies at least one wavelength slot per link;
  populating a wavelength slot set according to the network topology information with wavelength slots available for each link in the optical network;
  initializing a random demand set for storing the pairs of nodes in a demand sequence as an empty set;
  repeating until the wavelength slot set is empty:
    based on a node pair set specifying the existing links between the pairs of the nodes, randomly selecting a next pair of the nodes as a next network demand specifying at least one wavelength slot between the next pair; and
    when at least one wavelength slot is available from the wavelength slot set between the next pair of nodes, appending the next network demand to the random demand set to populate the random demand set according to the demand sequence; and
    removing the wavelength slots between the next pair of nodes from the wavelength slot set; and
  after the wavelength slot set is empty, outputting the random demand set to a user, wherein the random demand set represents 100% of a transmission capacity of the optical network.

11. The network management system of claim 10, further comprising instructions for:
initializing assignments of the wavelength slots to the optical network by removing all assigned wavelength slots based on the network topology information;
repeating, based on the network topology information, until the random demand set is empty:
  based on the demand sequence, selecting a first network demand from the random demand set;

if a continuous wavelength slot between the pair of the nodes specified by the first network demand is available in the optical network, using a wavelength assignment algorithm, assigning the first network demand to the optical network, wherein the continuous wavelength slot between the pair of the nodes specified by the first network demand is assigned to the first network demand;

if no continuous wavelength slot between the pair of the nodes specified by the first network demand is available, adding the first network demand to a blocked demand set indicating network demands blocked from being assigned to the optical network; and removing the first network demand from the random demand set.

12. The network management system of claim 11, further comprising instructions for:

evaluating the network demands assigned to the optical network by calculating a demand fill ratio (DFR) for the random demand set given by DFR=(assigned wavelength slots)/(total wavelength slots).

13. The network management system of claim 12, further comprising instructions to:

provisioning at least one optical path according to the network demands assigned to the optical network.

14. The network management system of claim 11, wherein the wavelength assignment algorithm is a first fit algorithm.

15. The network management system of claim 10, wherein the node pair set further specifies, for each of the pair of nodes:

a shortest path between the pair of nodes;

a number of wavelength slots between the pair of nodes;

a maximum number of wavelength conversions between the pair of nodes; and traffic capacity information for each of the wavelength slots, the traffic capacity information further comprising: a modulation format and a modulation rate.

16. The network management system of claim 10, wherein the pairs of the nodes are weighted according to a demand pattern, and wherein the instructions to randomly select the next pair of the nodes further comprise instructions for:

selecting wavelength slots between the next pair of the nodes to satisfy the demand pattern.

17. The network management system of claim 12, further comprising instructions for:

for each of the network demands in the blocked demand set, if a discontinuous wavelength slot is available between the pair of nodes specified by the network demand:

adding, to the optical network, at least one wavelength conversion between the pair of nodes specified by the network demand; and assigning the network demand to the discontinuous wavelength slot occupying different wavelengths in the optical network, wherein the wavelength conversion converts an optical signal between the different wavelengths.

18. The network management system of claim 17, further comprising instructions to:

with the wavelength conversions added to the optical network, recalculate the DFR for the optical network and the random demand set.

* * * * *